(12) United States Patent
Nag Yasa et al.

(10) Patent No.: US 9,292,530 B2
(45) Date of Patent: *Mar. 22, 2016

(54) OBJECT-LEVEL IDENTIFICATION OF DUPLICATE DATA IN A STORAGE SYSTEM

(75) Inventors: Giridhar Appaji Nag Yasa, Bangalore (IN); Nagesh Panyam Chandrasekarasastry, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 644 days.

This patent is subject to a terminal disclaimer.

(21) Appl. No.: 13/160,481

(22) Filed: Jun. 14, 2011

(65) Prior Publication Data

US 2012/0323860 A1    Dec. 20, 2012

(51) Int. Cl.
*G06F 7/00*    (2006.01)
*G06F 17/00*   (2006.01)
*G06F 17/30*   (2006.01)

(52) U.S. Cl.
CPC .................. *G06F 17/30156* (2013.01)

(58) Field of Classification Search
CPC .......... G06F 17/30156; G06F 3/0641
USPC .................. 707/692, 821
See application file for complete search history.

(56) References Cited

U.S. PATENT DOCUMENTS

| | | | |
|---|---|---|---|
| 6,912,645 B2 * | 6/2005 | Dorward et al. | 711/216 |
| 6,993,539 B2 | 1/2006 | Federwisch et al. | |
| 7,062,493 B1 | 6/2006 | Babka et al. | |
| 7,562,077 B2 | 7/2009 | Bisson et al. | |
| 7,624,106 B1 | 11/2009 | Manley et al. | |
| 7,739,317 B2 | 6/2010 | Asmi et al. | |
| 7,831,789 B1 | 11/2010 | Per et al. | |
| 7,865,608 B1 | 1/2011 | Schuba et al. | |
| 7,908,436 B1 | 3/2011 | Srinivasan et al. | |
| 7,921,110 B1 | 4/2011 | Ting et al. | |
| 8,176,018 B1 | 5/2012 | Bisson et al. | |

(Continued)

FOREIGN PATENT DOCUMENTS

KR    100985169 B1    10/2010

OTHER PUBLICATIONS

Notice of Allowance Mailed Mar. 6, 2012 in Co-Pending U.S. Appl. No. 12/112,651 of Bisson, T., et al., filed Apr. 30, 2008.

(Continued)

*Primary Examiner* — Marc Somers
(74) *Attorney, Agent, or Firm* — Matthew A. Pequignot; Pequignot + Myers LLC

(57) ABSTRACT

The technique introduced here includes a system and method for identification of duplicate data directly at a data-object level. The technique illustratively utilizes a hierarchical tree of fingerprints for each data object to compare data objects and identify duplicate data blocks referenced by the data objects. The hierarchical fingerprint trees are constructed in such a manner that a top-level fingerprint (or object-level fingerprint) of the hierarchical tree is representative of all data blocks referenced by a storage system. In embodiments, inline techniques are utilized to generate hierarchical fingerprints for new data objects as they are created, and an object-level fingerprint of the new data object is compared against preexisting object-level fingerprints in the storage system to identify exact or close matches. While exact matches result in complete deduplication of data blocks referenced by the data object, hierarchical comparison methods are used for identifying and mapping duplicate data blocks referenced by closely related data objects.

30 Claims, 10 Drawing Sheets

(56) References Cited

U.S. PATENT DOCUMENTS

| | | | |
|---|---|---|---|
| 8,250,325 B2 | 8/2012 | Holdman et al. | |
| 2005/0097313 A1 | 5/2005 | Bolosky et al. | |
| 2006/0068755 A1 | 3/2006 | Shraim et al. | |
| 2006/0075294 A1 | 4/2006 | Ma et al. | |
| 2006/0218135 A1 | 9/2006 | Bisson et al. | |
| 2008/0091945 A1 | 4/2008 | Princen et al. | |
| 2008/0195583 A1 | 8/2008 | Hsu et al. | |
| 2008/0222420 A1 | 9/2008 | Serret-Avila | |
| 2009/0271402 A1* | 10/2009 | Srinivasan et al. | 707/6 |
| 2010/0088296 A1 | 4/2010 | Periyagaram et al. | |
| 2010/0199066 A1* | 8/2010 | Artan et al. | 711/216 |
| 2011/0016152 A1 | 1/2011 | Popovski et al. | |

OTHER PUBLICATIONS

Final Office Action Mailed Sep. 2, 2011 in Co-Pending U.S. Appl. No. 12/112,651 of Bisson, T., et al., filed Apr. 30, 2008.
International Search Report PCT/US2012/041301 dated Feb. 26, 2013. pp. 1-3.
Written Opinion PCT/US2012/041301 dated Feb. 26, 2013, pp. 1-5.
International Search Report PCT/US2012/041297 dated Feb. 28, 2013, pp. 1-3.
Written Opinion PCT/US2012/041297 dated Feb. 28, 2013, pp. 1-6.
DeCandia, et al., Dynamo: Amazon's Highly Available Key-value Store, Oct. 2007, http://www.allthings_distributed,com/files/amazon-dynamo-sosp2007.pdf.
Co-pending U.S. Appl. No. 12/112,651, filed Apr. 30, 2008.
Co-pending U.S. Appl. No. 13/160,474, filed Jun. 14, 2011.
Non Final Office Action Mailed Mar. 22, 2011 in Co-Pending U.S. Appl. No. 12/112,651, filed Apr. 30, 2008.
Notice of Allowance Mailed Feb. 4, 2015 in Co-Pending U.S. Appl. No. 13/160,474, filed Jun. 14, 2011, 8 pp.
Final Office Action Mailed Sep. 3, 2014 in Co-Pending U.S. Appl. No. 13/160,474, filed Jun. 14, 2011, 19 pp.

* cited by examiner

OBJECT-LEVEL IDENTIFICATION OF DUPLICATE DATA IN A STORAGE SYSTEM

FIELD

At least one embodiment of the techniques discussed in this application pertains to data storage systems, and more particularly, to a technique for generating hierarchical fingerprints for data objects in a storage system to enable object-level identification of duplicate data in a storage system.

BACKGROUND

A network storage controller is a processing system that is used to store and retrieve data on behalf of one or more hosts on a network. A storage server is a storage controller that operates on behalf of one or more clients to store and manage data in a set of mass storage devices, such as magnetic or optical storage-based disks or tapes. Some storage servers are designed to service file-level requests from clients, as is commonly the case with file servers used in a network attached storage (NAS) environment. Other storage servers are designed to service block-level requests from clients, as with storage servers used in a storage area network (SAN) environment or virtual tape (VTL) environment. Still other storage servers are capable of servicing both file-level requests and block-level requests, as is the case with certain storage servers made by NetApp, Inc. of Sunnyvale, Calif.

In a large-scale storage system, such as an enterprise storage network, it is common for certain items of data, such as certain data blocks, to be stored in multiple places in the storage system, sometimes as an incidental result of normal operation of the system and other times due to intentional copying of data. For example, duplication of data blocks may occur when two or more logical containers of data (e.g., files, virtual tapes, etc.) have some data in common or where a given set of data occurs at multiple places within a given logical container of data. For example, consider a scenario where a user creates a Windows PowerPoint® document and stores the document at a first location of the storage system. The user sends the document over to another user, who then makes minor edits to one small section of the document. The second user then stores the edited document in a different location of the storage system. Here, we have two data objects (i.e., the two Windows® documents) that operate as logical containers of data. Each data object logically references a set of physical data blocks that stores the data corresponding to the documents. Since the two documents are substantially similar, there will be a substantial number of identical data blocks (i.e., duplicate data blocks) referenced by the two data objects. Duplication can also occur if the storage system backs up data by creating and maintaining multiple persistent point-in-time images, or "snapshots," of stored data over a period of time. Data duplication generally is not desirable, since the storage of the same data in multiple places consumes extra storage space, which is a limited resource.

Consequently, in many large-scale storage systems, storage controllers have the ability to "deduplicate" data, which is the ability to identify and remove duplicate data blocks. In one known approach to deduplication, data blocks referenced by two data objects (i.e., an original data object and a new data object) are compared and duplicate data blocks referenced by one of the data objects (e.g., the new data object) are deleted. Any references (e.g., pointers) of the new data object to those duplicate (deleted) data blocks are modified to refer to the remaining instances of those data blocks (i.e., the data blocks referenced by the original data object). A result of this process is that a given data block may end up being shared by the two data objects.

Further, in known deduplication approaches, the new data object (i.e., the data object referencing deduplicated data blocks) stores one-to-one mapping of each deleted data block to a corresponding data block referenced by the original data object. Such one-to-one mapping data is generated and stored for each individual deduplicated data block. Typically, such mapping information is stored in metadata associated with the data object.

Now consider the above example of the PowerPoint® documents. Each time a new copy of the document (i.e., a new data object) is created by a user to make minor edits, new data blocks (much of which are substantially similar to the original document) are created and stored within the storage server. Accordingly, a substantial number of data blocks referenced by these new copies (i.e., new data objects) will be identical to the original copy of the document. Even after the duplicate data blocks referenced by the new data object are deleted, each data object will still hold a substantial amount of "mapping metadata" to store mapping information for each deduplicated data block, consequently increasing the storage footprint of the corresponding data objects.

Additionally, in at least one known deduplication technique, duplicate data identification is performed only at the level of the physical data blocks. In other words, even when two data objects (e.g., files) are exactly or substantially identical (i.e., all or a substantial number of data blocks referenced by the data objects are duplicates), known deduplication techniques still compare each underlying data block referenced by the two data objects to identify duplicate data blocks. Such deduplication techniques do not have mechanisms for recognizing duplicate data at the object level (without comparing the underlying physical data blocks). Identification of duplicate data at the data block level, especially between identical or substantially similar data objects, unnecessarily burdens computational resources of the storage system.

SUMMARY

The techniques introduced here include a systems and methods for identification of duplicate data directly at a data-object level. The techniques illustratively utilize a hierarchical tree of fingerprints for each data object to compare data objects and identify duplicate data blocks referenced by the data objects. The hierarchical fingerprint trees include at least two layers of fingerprints. A base layer of the hierarchical tree includes one fingerprint for each data block referenced by a data object. A layer over the base layer includes a lesser number of fingerprints (relative to the base layer), where each entity, is a fingerprint of two or more fingerprints from an immediately lower layer. Any number of layers may be generated over the base layer in a similar manner, culminating at a single fingerprint at a top-most layer. This single fingerprint is representative of all the data blocks referenced by a data object, and is considered the object-level fingerprint of the data object.

In embodiments, inline techniques are utilized to generate hierarchical fingerprints for new data objects as they are created, and an object-level fingerprint of the new data object is compared against preexisting object-level fingerprints in the storage system to identify exact or close matches. While exact matches result in complete deduplication of data blocks referenced by the data object, hierarchical comparison methods are used for identifying and mapping duplicate data blocks referenced by closely related data objects. Further, in embodiments, the preexisting object-level fingerprints are categorized in different buckets based on their values to enable faster comparison of the new object-level fingerprint against the database of preexisting object-level fingerprints.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

I. Overview

The technique introduced here includes a system and method for identification of duplicate data directly at a data-object level. The technique illustratively utilizes a hierarchical tree of fingerprints for each data object to compare data objects and identify duplicate data blocks referenced by the data objects. The hierarchical fingerprint trees are constructed in such a manner that a top-level fingerprint (or object-level fingerprint) of the hierarchical tree is representative of all data blocks referenced by a storage system. In embodiments, inline techniques are utilized to generate hierarchical fingerprints for new data objects as they are created, and an object-level fingerprint of the new data object is compared against preexisting object-level fingerprints in the storage system to identify exact or close matches. While exact matches result in complete deduplication of data blocks referenced by the data object, hierarchical comparison methods are used for identifying and mapping duplicate data blocks referenced by closely related data objects.

II. System Environment

Figure 1:
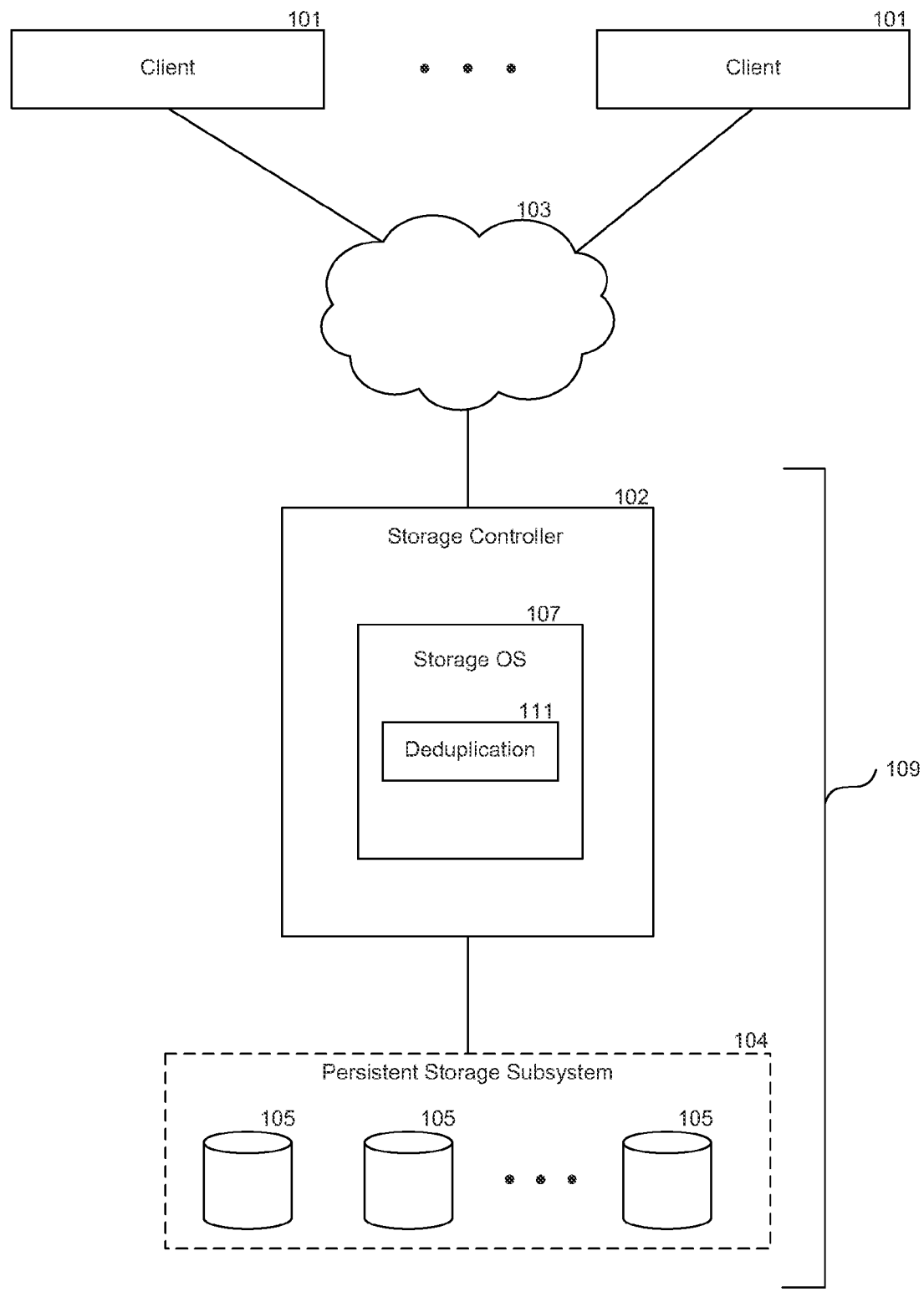
FIG. 1 shows a network storage system in which the technique introduced here can be implemented.

Refer now to FIG. 1, which shows a network storage system in which the technique being introduced here can be implemented. In FIG. 1, a storage controller 102 is coupled to a storage subsystem 104 and to a set of clients 101 through an interconnect 103. The interconnect 103 may be, for example, a local area network (LAN), wide area network (WAN), metropolitan area network (MAN), global area network such as the Internet, a Fibre Channel fabric, or any combination of such interconnects. Each of the clients 101 may be, for example, a conventional personal computer (PC), server-class computer, workstation, handheld computing/communication device, or the like.

Storage of data in the storage subsystem 104 is managed by the storage controller 102 configured to operate as a network storage server. The storage controller 102 and the storage subsystem 104 are collectively referred to herein as the storage system 109. The storage controller 102 receives and responds to various read and write requests from the clients 101, directed to data stored in or to be stored in storage subsystem 104. The storage subsystem 104 includes a number of nonvolatile mass storage devices 105, which can be, for example, conventional magnetic or optical disks or tape drives; alternatively, they can be non-volatile solid-state memory, such as flash memory, or any combination of such devices. The mass storage devices 105 in storage subsystem 104 can be organized as a Redundant Array of Inexpensive Disks (RAID), in which case the storage controller 102 can access the storage subsystem 104 using a conventional RAID algorithm for redundancy.

The storage controller 102 includes a storage operating system 107, which is responsible for managing storage of data in the storage subsystem 104, servicing requests from clients 101, and performing various other types of storage related operations. In the illustrated embodiment, the storage operating system 107 includes a deduplication system 111 which performs deduplication of data blocks, which may include operations related to identifying duplicate blocks, generating hierarchical fingerprint trees for data objects, mapping data objects sharing common data blocks, etc. In some embodiments, the deduplication system 111 may be a separate component that is different from the storage operating system 107. In certain embodiments, the storage operating system 107 and deduplication system 111 are both implemented in the form of software (executed by one or more programmable processors). In other embodiments, however, either or both of these elements may be implemented in pure hardware, e.g., specially-designed dedicated circuitry, or as a combination of software and specially-designed dedicated circuitry.

The storage controller 102 can be, for example, a storage server which provides file-level data access services to clients, such as commonly done in a NAS environment, or block-level data access services such as commonly done in a SAN environment, or it may be capable of providing both file-level and block-level data access services to hosts. Further, although the storage controller 102 is illustrated as a single unit in FIG. 1, it can have a distributed architecture. For example, the storage controller 102 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect, in a cluster configuration. In some instances, the deduplication 111 system is implemented as part of the D-blade of such an architecture.

Figure 2:
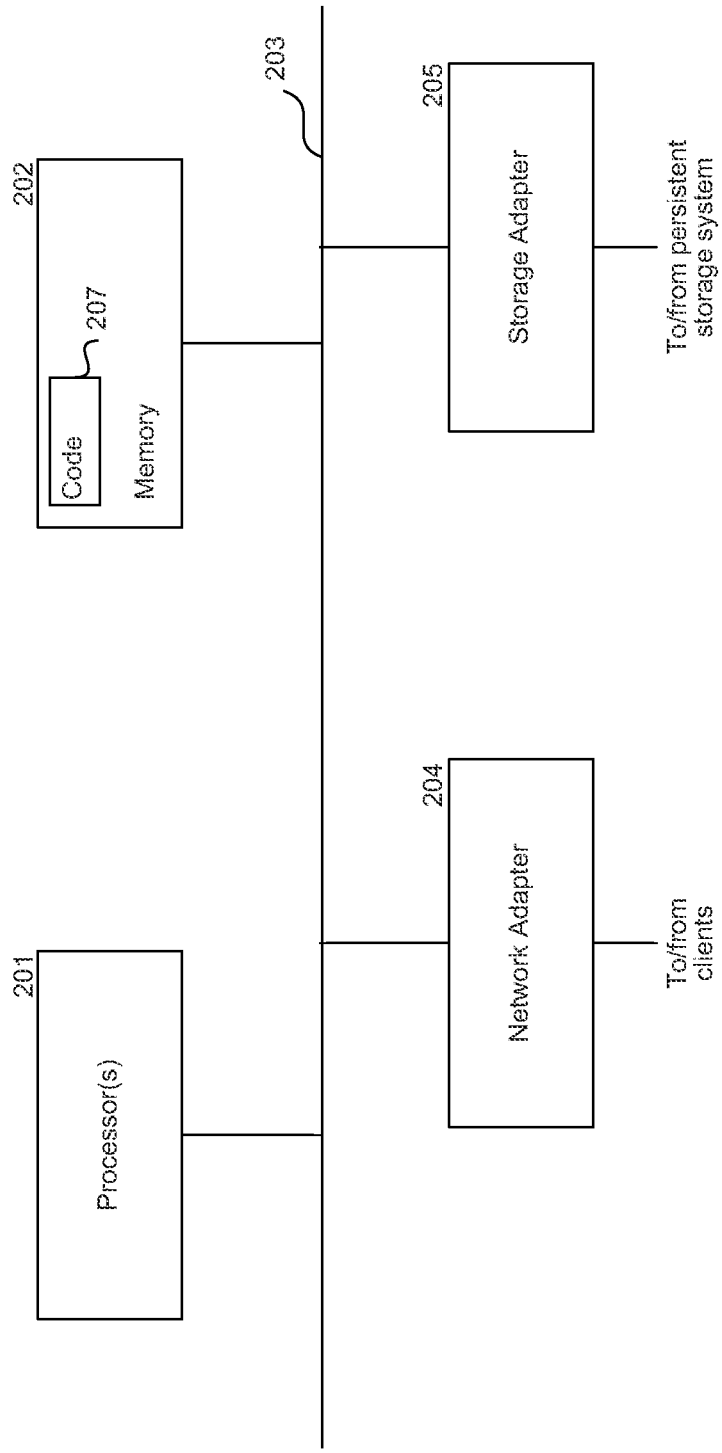
FIG. 2 is a high-level block diagram showing an example of the architecture of a storage controller.

FIG. 2 is a high-level block diagram showing an example of the architecture of the storage controller 102. The storage controller 102 includes one or more processors 201 and memory 202 coupled to an interconnect 203. The interconnect 203 shown in FIG. 2 is an abstraction that represents any one or more separate physical buses, point-to-point connections, or both, connected by appropriate bridges, adapters, or controllers. The interconnect 203, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 201 is/are the central processing unit (CPU) of the storage controller 102 and, thus, control the overall operation of the storage controller 102. In certain embodiments, the processor(s) 201 accomplish this by executing software or firmware stored in memory 202. The processor(s) 201 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 202 is or includes the main memory of the storage controller 102. The memory 202 represents any form of random access memory (RAM), read-only memory (ROM), flash memory, or the like, or a combination of such devices. In use, the memory 202 may contain, among other things, code 207 embodying the storage operating system 107 and/or the deduplication system 111.

Also connected to the processor(s) 201 through the interconnect 203 are a network adapter 204 and a storage adapter 205. The network adapter 204 provides the storage controller 102 with the ability to communicate with remote devices, such as clients 101, over the interconnect 203 and may be, for example, an Ethernet adapter or Fibre Channel adapter. The storage adapter 205 allows the storage controller 102 to access the storage subsystem 104 and may be, for example, a Fibre Channel adapter or SCSI adapter.

Figure 3:
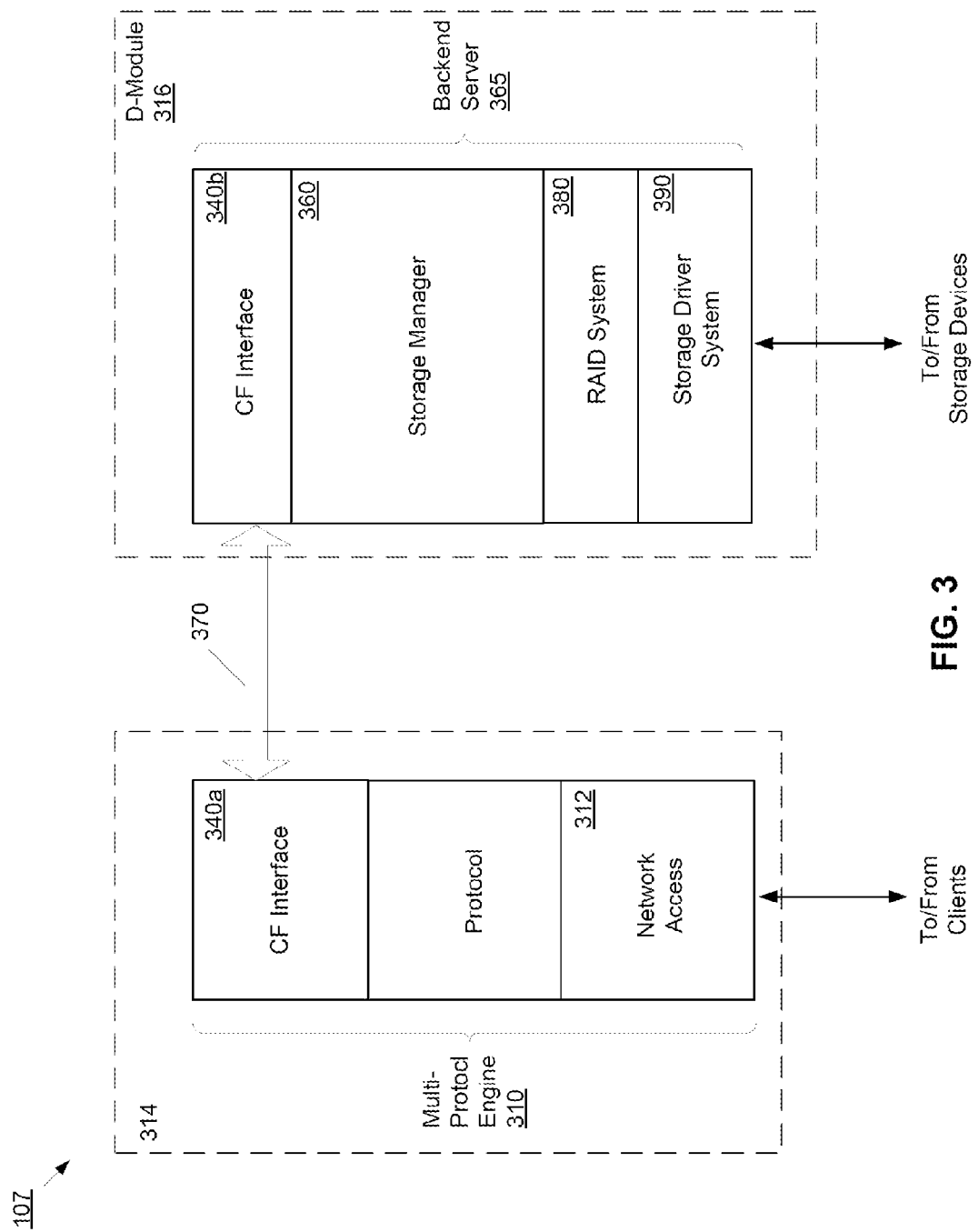
FIG. 3 is a diagram illustrating an example of storage operating system 107 that can be used with the techniques introduced here

FIG. 3 is a diagram illustrating an example of storage operating system 107 that can be used with the techniques introduced here. In the illustrated embodiment the storage operating system 107 includes multiple functional layers organized to form an integrated network protocol stack or, more generally, a multi-protocol engine 310 that provides data paths for clients to access information stored on the node using block and file access protocols. The multi-protocol engine 310 in combination with underlying processing hardware also forms N-module 314. The multi-protocol engine 310 includes a network access layer 312 which includes one or more network drivers that implement one or more lower-level protocols to enable the processing system to communicate over the network 103, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 310 also includes a protocol layer 318 which implements various higher-level network protocols, such as Network File System (NIS), Common Internet File System (CIFS), Hypertext Transfer Protocol (HTTP), Internet small computer system interface (iSCSI), etc. Further, the multi-protocol engine 310 includes a cluster fabric (CF) interface module 340a which implements intra-cluster communication with D-modules and with other N-modules.

In addition, the storage operating system 107 includes a set of layers organized to form a backend server 365 that provides data paths for accessing information stored on disks. The backend server 365 in combination with underlying processing hardware also forms D-module 316. To that end, the backend server 365 includes a storage manager module 360 that manages any number of volumes, a RAID system module 380 and a storage driver system module 390.

The storage manager 360 primarily manages a file system (or multiple file systems) and serves client-initiated read and write requests. In at least one embodiment the storage manager 360 implements the volumes/regions/extents/slabs based storage techniques introduced here. The RAID system module 380 manages the storage and retrieval of information to and from the volumes/disks in accordance with a RAID redundancy protocol, such as RAID-4, RAID-5, RAID-DP or declustered RAID (discussed below), while the disk driver system 390 implements a disk access protocol such as Serial ATA (SATA), SCSI or FC protocol (FCP).

The backend server 365 also includes a CF interface module 340b to implement intra-cluster communication 370 with N-modules and/or other D-modules. The CF interface modules 340a and 340b can cooperate to provide a single file system image across all D-modules 316 in the cluster. Thus, any network port of an N-module 314 that receives a client request can access any data container within the single file system image located on any D-module 316 of the cluster.

The CF interface modules 340 implement the CF protocol to communicate file system commands among the modules of clusters in the storage environment. Such communication can be effected by a D-module exposing a CF application programming interface (API) to which an N-module (or another D-module) issues calls. To that end, a CF interface module 340 can be organized as a CF encoder/decoder. The CF encoder of, e.g., CF interface 340a on N-module 314 can encapsulate a CF message as (i) a local procedure call (LPC) when communicating a file system command to a D-module 316 residing on the same node or (ii) a remote procedure call (RPC) when communicating the command to a D-module residing on a remote node of the cluster. In either case, the CF decoder of CF interface 340b on D-module 316 de-encapsulates the CF message and processes the file system command.

In operation of a node, a request from a client can be forwarded as a packet over the network 103 and onto the node, where it is received at the network adapter 204 (FIG. 2). A network driver of layer 312 processes the packet and, if appropriate, passes it on to a network protocol and file access layer for additional processing prior to forwarding to the storage manager 360. At that point, the storage manager 360 interprets the request and generates operations to load (retrieve) the requested data from the RAID system 380. The storage manager 360 determines in which extent and in which region the data resides. The region receives a request for that (portion of) extent and in turn determines the slab(s) containing the requested data. The request is then handed to the RAID system module 380 for further processing and the determination of which storage device(s) hold the data, before issuing requests to the appropriate storage device driver(s). The storage device driver(s) access(es) the data from the specified device(s) and loads the requested data block(s) in memory for processing by the node. Upon completion of the request, the node (and operating system) returns a reply to the client.

The data request/response "path" through the storage operating system 107 as described above can be implemented in general-purpose programmable hardware executing the storage operating system 107 as software or firmware. Alternatively, it can be implemented entirely or partially in specially designed hardware. That is, in an alternate embodiment of the invention, some or all of the storage operating system 107 is implemented as logic circuitry embodied within, for example, one or more field programmable gate arrays (FP- GAs), application specific integrated circuits (ASICs), programmable logic devices (PLDs), or some combination thereof.

The N-module 314 and D-module 316 each can be implemented as processing hardware configured by separately-scheduled processes of storage operating system 107; however, in an alternate embodiment, the modules may be implemented as processing hardware configured by code within a single operating system process. Communication between an N-module 314 and a D-module 316 is thus illustratively effected through the use of message passing between the modules although, in the case of remote communication between an N-module and D-module of different nodes. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

III. Internal Functionality and Architecture

Figure 4A:
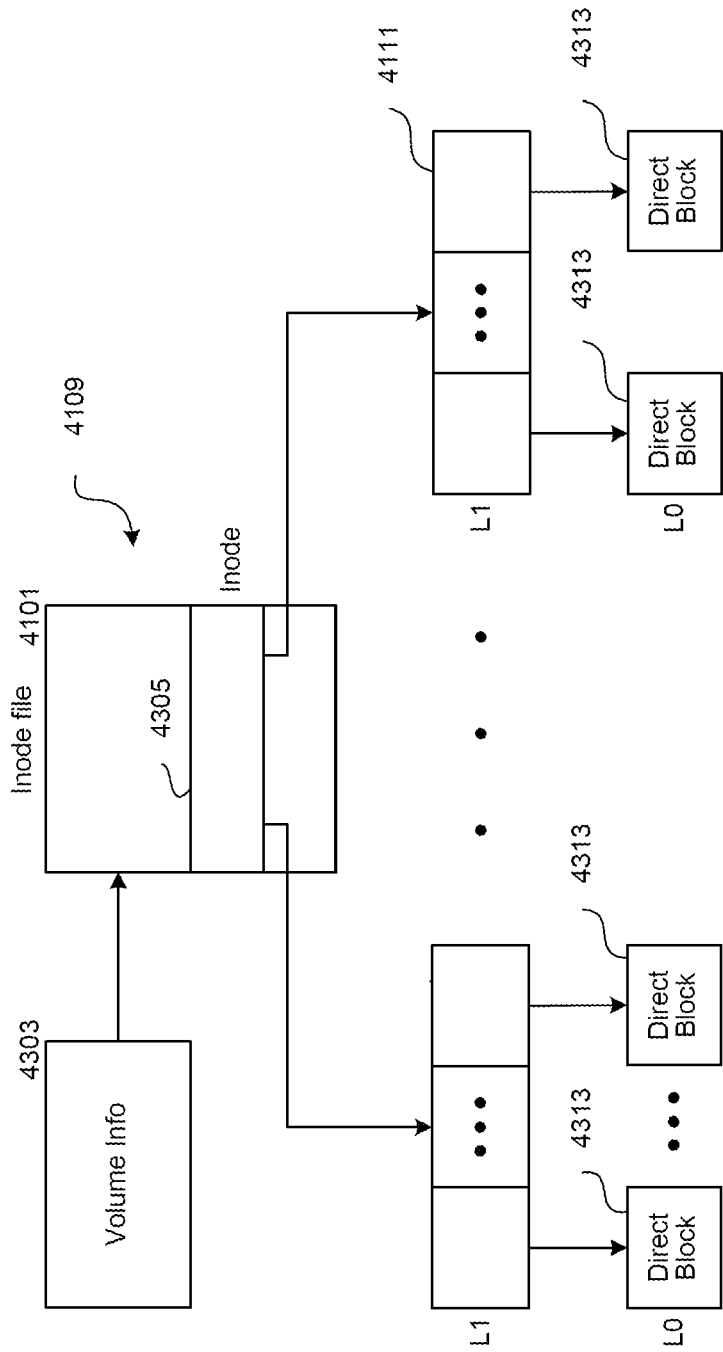
FIG. 4A shows an example of a buffer tree and the relationship between inodes, an inode file and the buffer tree.

It is useful now to consider how data can be structured and organized by the storage system 109. Reference is now made to FIG. 4A in this regard. In at least one embodiment, data is stored in the form of volumes, where each volume contains one or more directories, subdirectories and/or files. The term "aggregate" is used to refer to a pool of storage, which combines one or more physical mass storage devices (e.g., disks) or parts thereof into a single logical storage object. An aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories and files.

In certain embodiments, a logical data object such as a file (or other form of logical data container, such as a logical unit or "LUN") is represented in a storage system 109 in the form of a hierarchical structure called a "buffer tree". A buffer tree is a hierarchical structure which is used to store file data as well as metadata about a logical data object (simply, "data object") such as a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the data in the file is stored only at the lowest level (L0) blocks.

The root of a buffer tree is the "inode" of the file. An inode is a metadata container that is used to store metadata about the file, such as ownership, access permissions, file size, file type, and pointers to the highest level of indirect blocks for the file. Each file has its own inode. The inode is stored in a separate inode file, which may itself be structured as a buffer tree.

FIG. 4A shows an example of a buffer tree 4109 for a file. The file is assigned an inode 4305, which references Level 1 (L1) indirect blocks 4111. Each indirect block 4111 stores two or more pointers to a lower-level block, e.g., a direct block 4313. Each pointer in an L1 and indirect block 4111 references a physical data storage block (or simply, "data block") 4313 in a storage device (i.e., in the aggregate).

For each volume managed by the storage controller 102, the inodes of the files and directories in that volume are stored in a separate inode file, such as inode file 4101 in FIG. 4A which stores inode 4305. A separate inode file is maintained for each volume. The location of the inode file for each volume is stored in a Volume Information ("VolumeInfo") block 4303 associated with that volume, such as VolumeInfo block 4103 in FIG. 3. The VolumeInfo block 4303 is a metadata container that contains metadata that applies to the volume as a whole. Examples of such metadata include, for example, the volume's name, type, size, any space guarantees to apply to the volume, and a pointer to the location of the inode file of the volume.

IV. Duplicate Data Identification and Deduplication

Figure 4B:
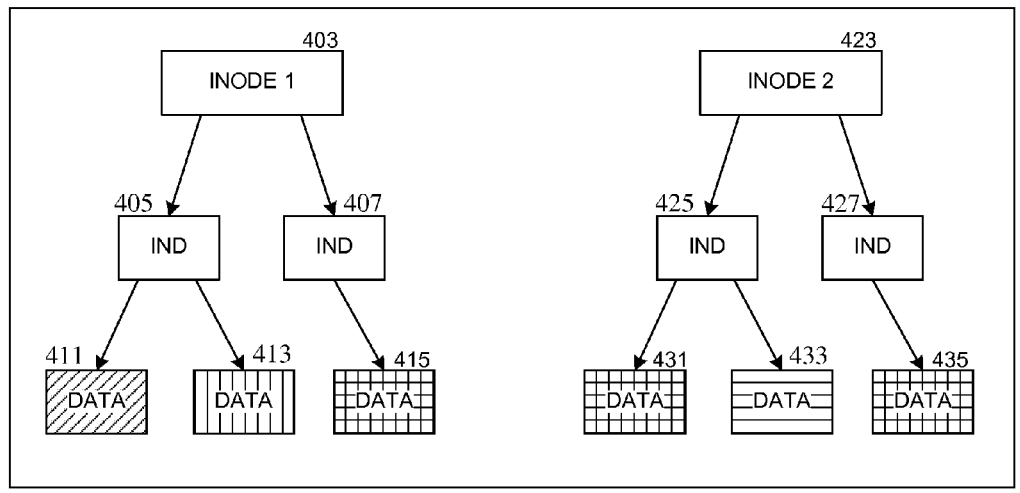
FIGS. 4B and 4C illustrate an example of two buffer trees before and after deduplication of data blocks, respectively.
Figure 4C:
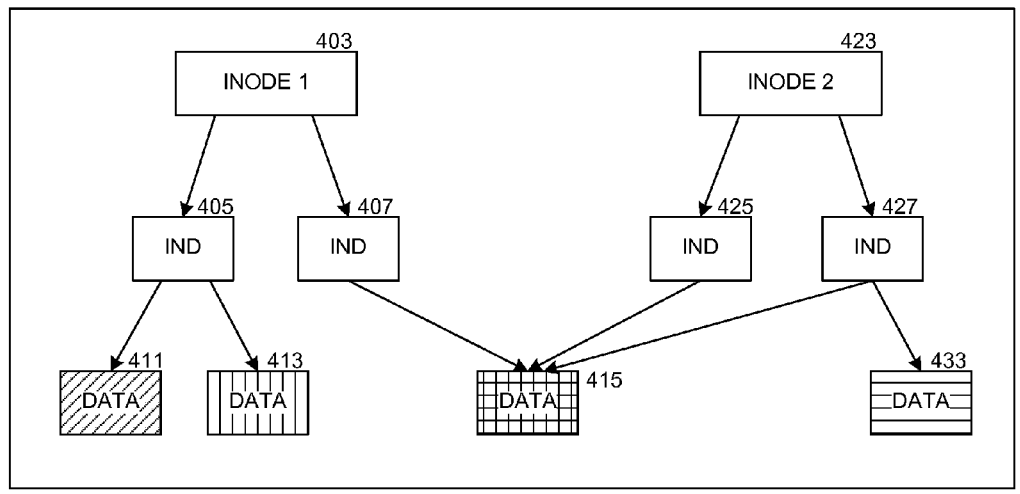

Now consider the process of deduplication. FIGS. 4B and 4C show an example of the buffer trees of two files, where FIG. 4B shows the two buffer trees before deduplication and FIG. 4B shows the two buffer trees after deduplication. The root blocks of the two files are Inode 1 403 and I node 2 423, respectively. The numerals in FIGS. 4B and 4C are the values of the pointers to the various blocks and, in effect, therefore, are the identifiers of the data blocks. The fill patterns of the direct (L0) blocks in FIGS. 4B and 4C indicate the data content of those blocks, such that blocks shown with identical fill patterns are identical. It can be seen from FIG. 4B, therefore, that data blocks 415, 431, and 435 are identical. In contrast, data blocks 411, 413, and 433 are different as indicated by the different fill patterns. The Inode 1 403 references an indirect block 405 and an indirect block 407. The indirect block 405 references data blocks 411, 413 in both FIGS. 4B and 4C. The indirect block 407 references the data block 415 in both FIGS. 4B and 4C. The Inode 2 423 references an indirect block 425 and an indirect block 427 in both FIGS. 4B and 4C. The indirect block 425 references data blocks 431, 433 in FIG. 4B. The indirect block 427 references the data block 435 in FIG. 4B. In FIG. 4C, the indirect block 425 references the data block 415. In FIG. 4C, the indirect block 427 references the data block 415 and the data block 433.

The result of deduplication is that these three data blocks are, in effect, coalesced into a single data block, identified by pointer 415, which is now shared by the indirect blocks that previously pointed to data block 431 and data block 435. Further, it can be seen that data block 415 is now shared by both files. In a more complicated example, data blocks can be coalesced so as to be shared between volumes or other types of logical containers. Note that this coalescing operation involves modifying the indirect blocks that pointed to data blocks 431 and 435, and so forth, up to the root node. In a write out-of-place file system, that involves writing those modified blocks to new locations on disk.

The collection of the coalesced data blocks, along with the references pointing (e.g., the data objects) to the coalesced data blocks are referred to herein as a "dataset." In some instances, the dataset may be, for example, a particular volume (or other types of logical containers) of the storage system 109. In other instances, the dataset may include, for example, multiple volumes (or other types of logical containers) of the storage system 109.

To identify duplicate data blocks, a hash function, such as MD5, SHA-1, SHA-256 or SHA-512, can be applied to all used (unfree) data blocks in the data set to be deduplicated. The output of the hash function is a value for each data block, called a fingerprint, where identical data blocks have the same fingerprint. By comparing the fingerprints during a subsequent deduplication process, duplicate data blocks can be identified and coalesced. Data blocks with identical fingerprints are possible duplicates. Once possible duplicates are identified from their fingerprints, a byte-by-byte comparison of those possible duplicates can be done to determine whether they are in fact duplicates of each other. Because the fingerprint of a block is much smaller than the data block, fingerprints for a very large number of data blocks can be stored without consuming a significant portion of the storage capacity in the system.

Figure 5A:
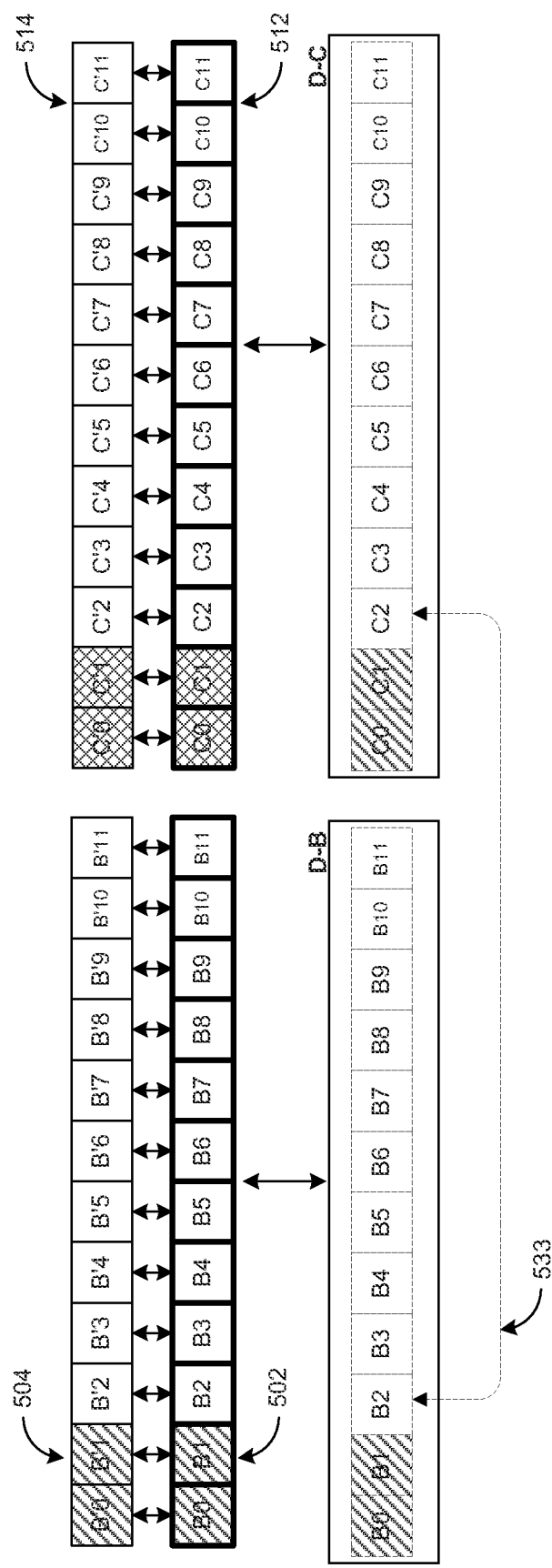
FIG. 5A depicts two data objects that are compared and mapped without the use of hierarchical trees of fingerprints.

While duplicate data blocks referenced by a data object (e.g., a file) is deleted (as a result of a deduplication process), metadata associated with the data object would need to store information about newly referenced data blocks (i.e., new data blocks referenced by the data object as a result of the deduplication process). Consider, for example, FIG. 5A. Data object D-B references twelve data blocks 502, namely data blocks B0 through B11. Data object D-C references twelve data blocks 512, namely data blocks C0 through C11. As illustrated in FIG. 5A, data object D-C references ten data blocks (C2 through C11) that are common to (i.e., duplicate of) data blocks referenced by data object D-B. Data blocks C0 and C1 are different from corresponding data blocks B0 and B1 (as indicated in FIG. 5A by use of different shading for the non-duplicate data blocks).

Deduplication is now done to remove duplicate data blocks. As will be explained further below, deduplication may be done inline (i.e., when data object D-C is first created and is being attempted to be written by the storage server, thus preventing duplicate data blocks from being stored at all) or post-write (i.e., after the data object D-C has already been stored and the duplicate data blocks already exist in the system and have to be subsequently deleted). In embodiments, as explained above, deduplication is performed by comparing fingerprints of each data block with other data blocks. FIG. 5A illustrates fingerprint layers 504 and 514 respectively for data blocks referenced by data objects D-B and D-C. When deduplication is done to remove the duplicate data blocks referenced by data object D-C, for example, data blocks C2 through C11 are deleted (or prevented from being stored in an inline deduplication scenario). The logical references of data object D-C to the deleted data blocks (data blocks C2 through C11) are then redirected to corresponding data blocks (data blocks B2 through B11).

One manner in which such redirection can be done is by doing a one-to-one mapping of logical references of the deleted blocks (e.g., from data object D-C) to corresponding data blocks referenced by data object D-B. This redirection may be done directly at the physical data block level (for example, at the L0 level explained in FIGS. 4B and 4C) by pointing the references of the relevant (deleted) blocks directly to the data blocks referenced by data object D-B. Alternatively, or in addition to making a logical reference directly to the data blocks, redirection may also be done by mapping the logical references of data object D-C (relating to the deleted data blocks) directly to corresponding logical references of data object D-B. For example, a logical reference to deleted data block C2 (from data object D-C) would simply be mapped to data object D-B's logical reference to data block B2. Effectively, logical reference is now made to the physical data block corresponding to data block B2 via the logical data object D-B, as illustrated by mapping connector 533 (only one exemplary mapping is shown in FIG. 5A for the purpose of illustration). Such a mapping of logical references (via data objects) may be stored in metadata corresponding to the relevant data objects. For example, data object D-C would store metadata about the mapping of logical references in associated metadata.

In embodiments, the mapping-related metadata (or simply, "mapping-metadata") may include a one-to-one mapping of each redirected reference (i.e., for every duplicate data block). Such a one-to-one mapping may be unavoidable in situations where there is a small number of common or duplicate data blocks. But in situations where the there is a substantial number of common data blocks between two data objects (or even a situation where two identical data objects reference two completely identical sets of data blocks), the one-to-one mapping results in a large amount of mapping-metadata to be stored. Such is the situation in the exemplary deduplication illustrated with reference to FIG. 5A. There are only two common data blocks. Here, a mapping of each of the C2 through C11 data blocks to corresponding B2 through B11 data blocks would need to be stored in metadata associated with data object D-C. This increases the overall storage footprint for data object D-C, despite being almost exactly identical to data object D-B.

V. Hierarchical Fingerprint Trees for Data Objects

Figure 5B:
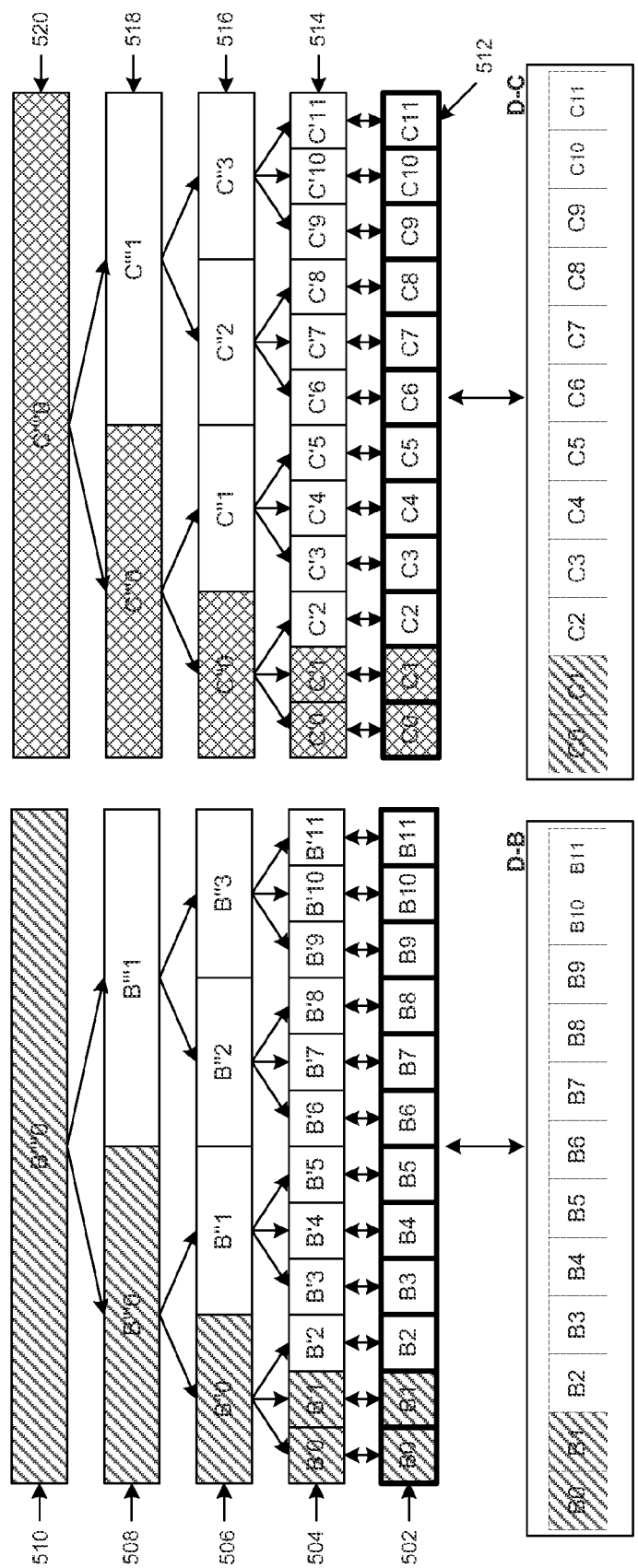
FIG. 5B depicts two data objects that are compared and mapped with the use of hierarchical trees of fingerprints.

To alleviate the problem of storing excessive mapping-metadata, the techniques discussed herein present the use of hierarchical trees of fingerprints for storing mapping information for deduplicated data objects. Examples of such hierarchical trees of fingerprints (simply, "hierarchical trees"), and an illustration of how the hierarchical trees may be used to reduce the amount of mapping-metadata stored for deduplicated data objects are provided here with reference to FIG. 5B. FIG. 5B illustrates two data objects, data object D-B and data object D-C. Similar to the illustration in FIG. 5A, the two data objects reference 12 data blocks each. Data object D-B references a set of twelve data blocks 502 and data object D-C references a set of twelve data blocks 512. Again, apart from two data blocks (i.e., data blocks C0 and C1), all data blocks referenced by data object D-C are identical (or duplicate) to corresponding data blocks referenced by data object D-B.

Similar to the illustration in FIG. 5A, fingerprints are generated and stored (e.g., as metadata) for each of the data blocks referenced by the two data objects. This first level of fingerprints, where every data block has a separate fingerprint, is referred to as the first layer or "F0" layer of fingerprints. Data object D-B has an F0 layer 504 with twelve fingerprints and data object D-C has an F0 layer 514 with twelve fingerprints. Subsequently, a second layer of fingerprints, the "F1" layer is built on top of the F0 layer. The F1 layer has fewer fingerprints than the F0 layer, and is constructed by generating a fingerprint using two or more fingerprints from the F0 layer. Typically, the fingerprints in the F1 layer would each correspond to a constant number (of value 2 or greater) of fingerprints from the F0 layer. A similar mechanism of grouping and construction is applied to both data objects illustrated in FIG. 5B. The F1 layer 506 of data object D-B has four fingerprints, where each fingerprint is a fingerprint of three fingerprints from the F0 layer. In a similar manner, any number of layers can be built over the base layer (i.e., the F0 layer), until a top layer that has just one fingerprint is achieved. In the illustration, a third layer (F2 layer) is constructed over the F1 layer, the F2 layer having 2 fingerprints (each corresponding to two fingerprints from the immediately lower F1 layer). The top F3 layer (510 and 520 respectively for data objects D-B and D-C) has just one fingerprint, that is a fingerprint of all fingerprints from the immediately lower F2 layer (508 and 518 respectively for data objects D-B and D-C). Accordingly, the top layer fingerprint is effectively representative of all fingerprints (and thus all data blocks) corresponding to each data object.

It is understood that any number of groupings of fingerprints and any number of layers may be generated in this manner until a top layer with a single fingerprint is achieved. For example, the F1 layer 506 for data object D-B may use two fingerprints from the lower layer (instead of the illustrated 3 fingerprints), resulting in a higher granularity in the fingerprints of the F1 layer. Alternatively, the F1 layer could use six fingerprints from the lower layer, resulting in a lesser number (and corresponding lesser granularity) of fingerprints in the F1 layer. The total number of layers would thus increase or decrease, depending on the chosen granularity. The resulting tree of fingerprints, ranging from the top layer to the base layer, with any number of intermediate layers, is the hierarchical fingerprint tree of each data object.

In embodiments, the entire hierarchical tree is stored in metadata in association with each data object. In embodiments, each layer of the hierarchical tree may be collectively stored in a different logical container (e.g., a different volume for each layer) for organizational purposes. Given the copious number of data blocks that typical data objects would refer to, it can be envisioned that the amount of storage space consumed by storing the hierarchical trees for these data objects would be much lesser than storing extensive one-to-one mapping information for each deduplicated data block.

Subsequent to constructing the hierarchical trees, identification and mapping of duplicate blocks may be done at different layers of the hierarchical tree as will be explained here. It is noted that the hierarchical trees may be generated at any time, depending for example, on storage policies imposed by an administrator. In embodiments, the hierarchical trees may be constructed as soon as data objects are created. In embodiments, the hierarchical trees may be constructed at periodic intervals for all objects created or modified within a set period. In embodiments, the hierarchical trees may be constructed when deduplication routines are executed.

As indicated above, instead of comparing the direct base layer fingerprints to detect duplicate data blocks, the entire hierarchical trees of the two data objects are compared. Comparison of the two hierarchical trees commences at the top layer (which typically includes a single fingerprint representative of all data blocks referenced by the data block). If the top layer fingerprints match, then the two data objects are identified as duplicate objects in their entireties. If that is the case, the top-layer fingerprint of the duplicate data object (e.g., data object D-C) is directly mapped to the top-layer fingerprint of the original data object (e.g., data object D-B). As explained above, conventionally, references of each data block in data object D-C would have been mapped to references of corresponding data blocks in data object D-B. Such a one-to-one mapping would have required 12 mappings (one for each data block of data object D-C). Instead, using the hierarchical trees, only one mapping would be required (i.e., the mapping from top-layer fingerprint to top-layer fingerprint) for deduplication purposes. The entire set of data blocks referenced by data object D-C may now be deleted, with the logical references now mapped to data object D-B.

However, the above discussion assumed that the entire set of data blocks referenced by data object D-C was identical to data blocks referenced data object D-B. Now consider the scenario where there is at least one data block that is not common between the two data objects. Such is the scenario in FIG. 5B. Here, data blocks C0 and C1 are not duplicates of corresponding data blocks B0 and B1. All other data blocks referenced by the two data objects are common (duplicate) and will need to be deduplicated. Here, comparison starts again at the top layer. The top layer 510 of D-B does not match the top layer 520 of D-C because the top layers are representative of all data blocks of the data object, and thus will include the two non-identical data blocks. Comparison then next proceeds to the next lower layer. This layer, as illustrated, has two fingerprints each. One of the fingerprints is hierarchically linked to the two non-identical data blocks (in addition to some identical blocks), while the other is hierarchically linked to six identical blocks. Accordingly, there will be one matching fingerprint and one non-matching fingerprint at this layer. Consequently, the matching fingerprint C'''1 of layer 518 is mapped to corresponding fingerprint B'''1 of layer 508. This single mapping, from C'''1 to B'''1 is indicative or representative of mappings of mapping between data blocks C6 through C11 to corresponding data blocks B6 through B11.

Subsequently, the matching process proceeds to the next lower layer only for the fingerprints that did not match at the current level. Accordingly, fingerprints corresponding to C'''0 are mapped to fingerprints corresponding to B'''0 at the next lower layer (layer 506 and 516). At this level, again, one fingerprint corresponds to non-identical data blocks, while the other corresponds to identical data blocks. A process similar to the process from the previous step is performed, causing the matching fingerprints to be mapped at this layer (i.e., layers 506 and 516) and allowing the matching process to continue to the next lower layer only for the non-identical or non-matching fingerprints at the current layer. If there are non-identical data blocks, it can be envisioned that the process would continue all the way to the base layer (e.g., layers 504 and 514) for at least the hierarchical portion of the tree that corresponds to the non-identical data blocks.

In other words, a comparison is made of fingerprints starting from the top layer and progressing downward to the base layer. Mapping of matching fingerprints is done at the topmost layer where the fingerprints match, and continued matching of fingerprints at a lower layer is done only for non-matching fingerprints at the current layer.

In the illustrated example in FIG. 5B, a conventional mapping would have required 10 mappings, one for each duplicate data block in data object D-C. However, by mapping using the hierarchical trees, the number of mappings reduces to just 3 mappings (one at layer 518 mapping C'''1 to B'''1, one at layer 516 mapping C''1 to B''1, and one at layer 514 mapping C'2 to B'2).

Figure 6:
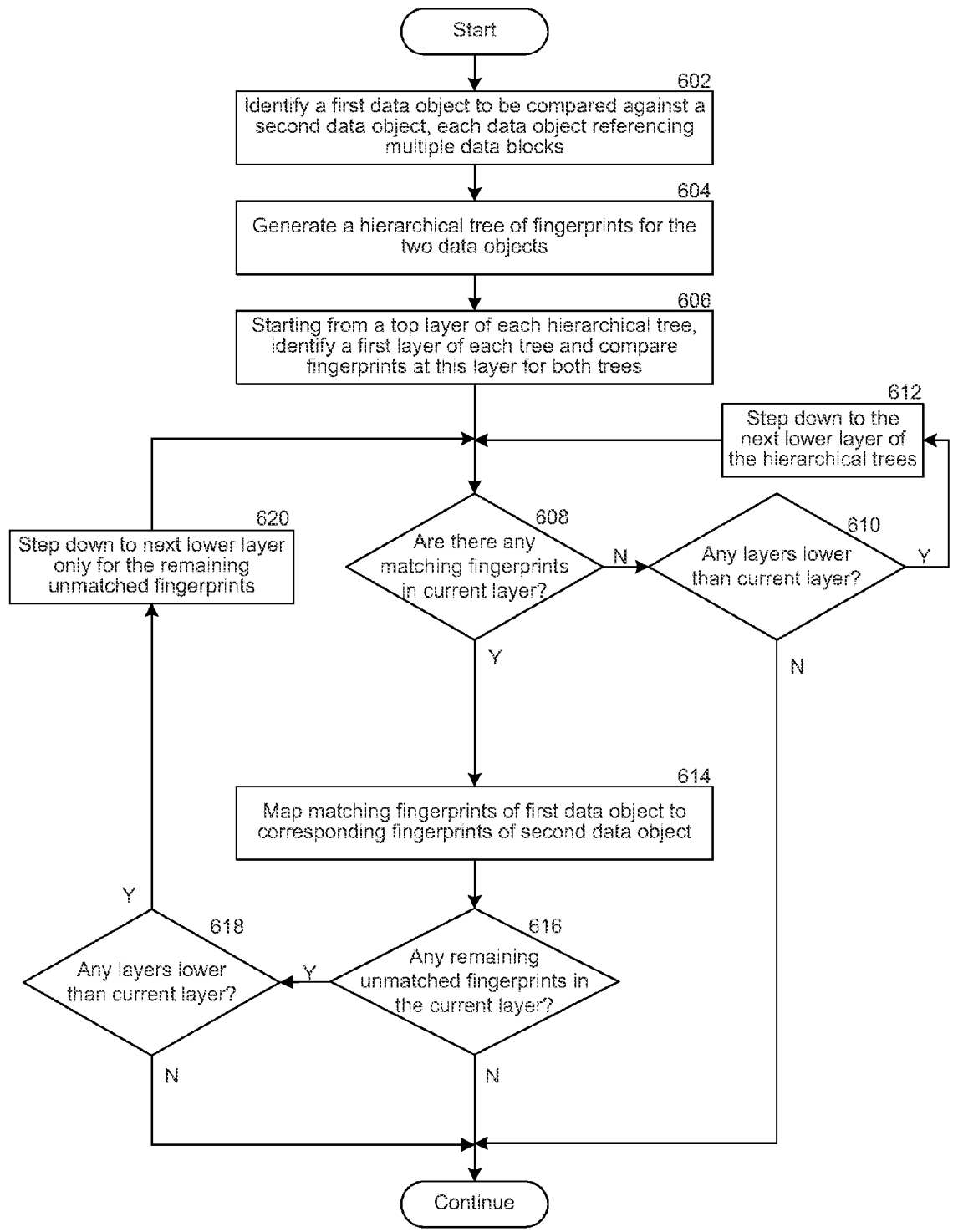
FIG. 6 is a flow diagram explaining a process for identifying and mapping duplicate data blocks in a data object.

Refer now to FIG. 6, which is a Plow diagram explaining a process for identifying and mapping duplicate data blocks in a data object. As explained in FIGS. 1-4, each of the following steps required for identification and deduplication of duplicate data blocks may be performed, for example, by the deduplication system 111 of the storage controller 102. The process starts at block 602, where the deduplication system 111 identifies a first data object that needs to be compared against an existing data object (second data object) in the storage system. At block 604, the deduplication system 111 generates a hierarchical tree of fingerprints for both data objects, if one does not already exist for either data object. Subsequently, at block 606, the deduplication system 111 performs a hierarchical comparison of the fingerprint trees, starting at the top layer. For each layer, the deduplication system 111 identifies whether there are any matching fingerprints, as indicated in block 608. If any fingerprint matches at this layer, processing continues to block 614, where the matching fingerprints of the first data object are matched to corresponding fingerprints of the second data object. Subsequently, at block 616, the deduplication system 111 verifies whether there are any remaining unmatched fingerprints in the current layer. If there are, processing is stepped to the next lower layer only for the unmatched fingerprints, as indicated in blocks 618 and 620. If no matching fingerprints are identified at block 608, the deduplication system 111 determines whether there are any layers lower than the current layer, as indicated in block 610. If lower layers are found, processing is shifted to the next lower layer in step 612 and matching is done again at block 608 for the lower layer. In this manner, all identical data blocks of the first data object are mapped to corresponding data blocks at the top-most layer of the hierarchical tree at which they match. Either before the mapping operation or subsequent to the mapping operation, the identified duplicate data blocks are deleted from the storage system as appropriate as part of the deduplication process.

V. Object-Level Identification and Mapping of Duplicate Data Objects

The above discussion illustrated scenarios where a first data object is compared to a preexisting second data object and how duplicate data blocks referenced by the second data object are deduplicated. There are several manners by which the second data object may be selected to be compared against the first data object. In embodiments, a top layer fingerprint (i.e., the single fingerprint of the hierarchical tree that is representative of all data blocks referenced by a data object) of the first data object may be compared against every top-layer fingerprint corresponding to the preexisting data objects in the storage system. A top-layer fingerprint may otherwise be referred to as an object-level fingerprint of the data object. Comparison can be done by directly comparing (e.g., by doing a numerical comparison) a value of the first object-level fingerprint to values of each of the preexisting object-level fingerprints in the storage system. However, such a comparison may be computationally expensive considering the enormous number of preexisting data objects in the data system. Accordingly, this description further addresses techniques for reducing the amount of computations necessary for identifying the second data object.

Figures 7A, 7B:
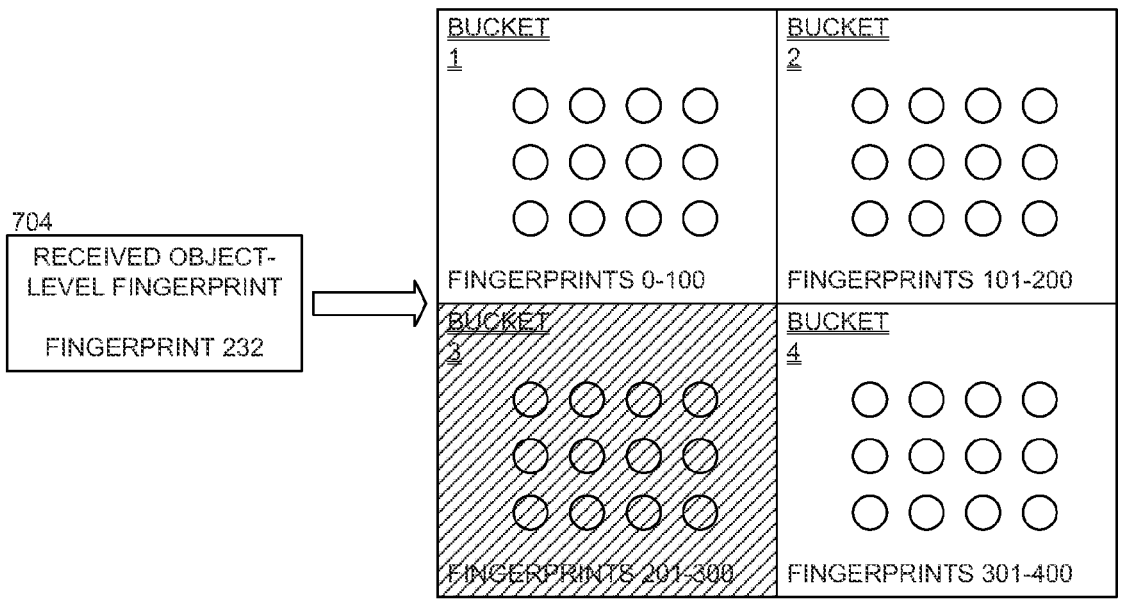
FIGS. 7A and 7B depict the use of buckets for classifying object-level fingerprints.

In embodiments, the object-level fingerprints of the preexisting data objects are s in, for example, a numerical order in a database in the storage system. Accordingly, the received or first object-level fingerprint may be compared only against a range of preexisting fingerprints that correspond to a subset of values that are close to the value of the first object-level fingerprint. For example, if the value of a received first object-level fingerprint is 6330, and there are a million preexisting object-level fingerprints, the received object-level fingerprint may be compared against a subgroup of preexisting object-level fingerprints ranging in values from 5000 to 10000 in the sorted list. Alternatively, or in addition to a sorted list, the storage system may also create buckets of preexisting top-level fingerprints. Each bucket stores or refers to a subset of the preexisting object-level fingerprints, for example, based on a value of the object-level fingerprints. FIG. 7A illustrates such a bucket-based classification of preexisting object-level fingerprints. The preexisting object-level fingerprints are placed in one of four buckets here, based on their values. Here, as illustrated for example in FIG. 7B, when a first object-level fingerprint is received, it is compared against one of the buckets based on the value of the object-level fingerprint. For example, as illustrated in FIG. 7B, a received object-level fingerprint has a value of 232, and is therefore compared only against the fingerprints in bucket 3, which range from values 201 to 300.

Object-level comparisons offer further computational benefits. Conventionally, fingerprints corresponding to each data block referenced by a data object would need to be compared against data blocks referenced by other data blocks. Instead, object-level fingerprint comparisons allow a single comparison between two data objects to identify identical data objects on an entity-level. Even if the two data objects are not exactly identical, the object-level comparison further helps identify closely related data objects such that the duplicate identification and mapping processes explained above may be executed. For example, consider the example in FIG. 7B, where the received object-level fingerprint 704 has a value 233. Even if bucket 3 does not have a matching fingerprint with the exact "233" value, the storage system identifies the closest fingerprint (e.g., a fingerprint with a "238" value), Given the closeness of the value of the received object-level fingerprint, it can be adjudged that the related data object has a high probability of referencing data blocks that are identical to at least some of the data blocks referenced by the received data object.

Figure 8:
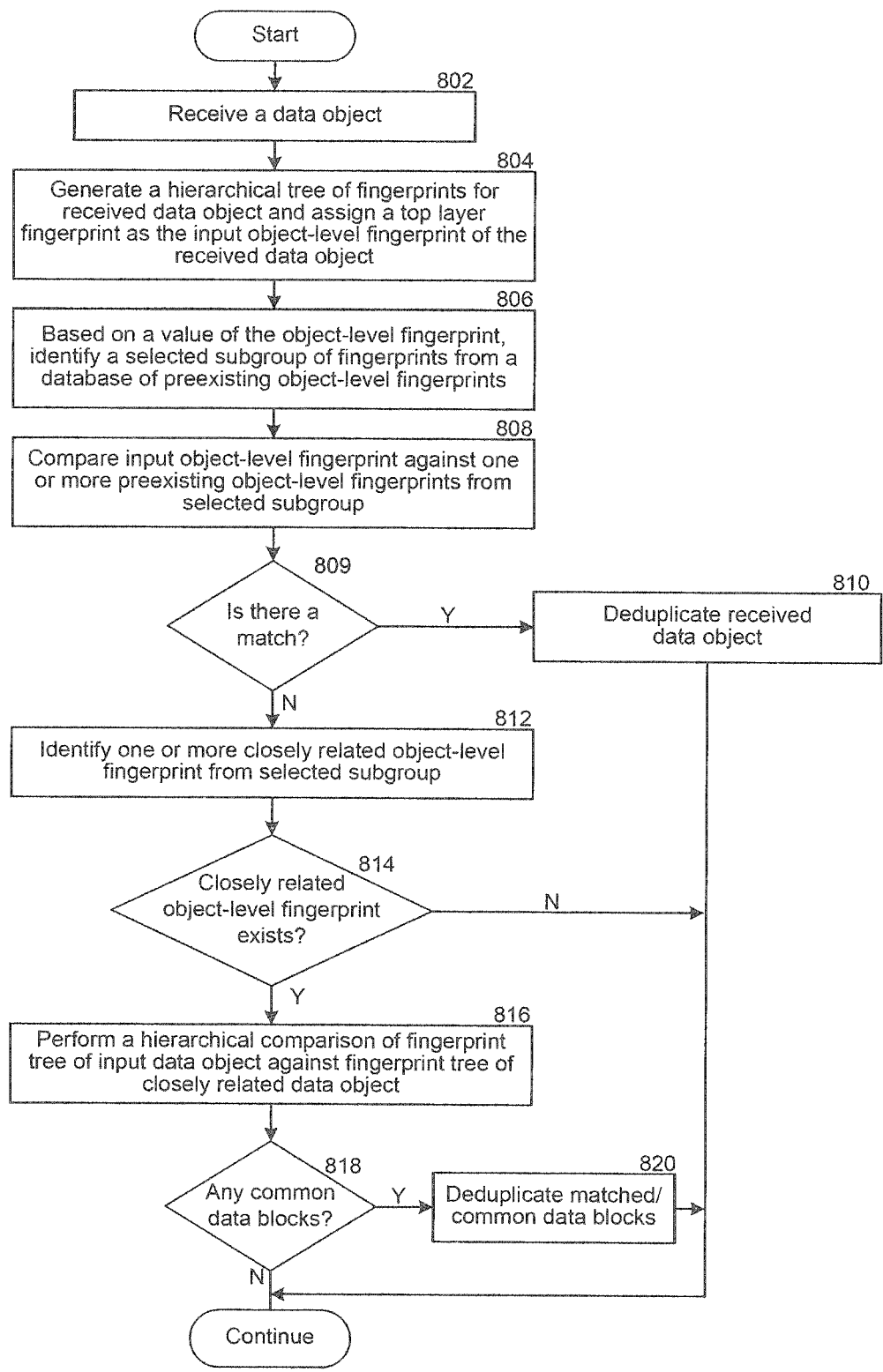
FIG. 8 illustrates a flow diagram that depicts a process by which the deduplication system performs object-level deduplication.

FIG. 8 illustrates a flow diagram that depicts a process by which the deduplication system 111 performs object-level deduplication. At block 802, the deduplication system 111 identifies or receives a data object. In embodiments, as indicated above, the deduplication system may perform an inline deduplication, meaning that the data object is a new data object that is to be written (or has not yet been stored) within the storage system. In such an inline scenario, the deduplication system 111 eliminates duplicate data blocks even before storing the data object to improve deduplication efficiency and to avoid having to store data blocks that will need to be deleted at a later time. It is noted that this process may also be performed on data objects that have already been stored within the storage system. For example, a deduplication routine run by the deduplication system every three days may trawl the storage system for duplicate data blocks (after such data blocks have been stored within the storage system) and delete the identified duplicate blocks. In either scenario, the deduplication system then generates a hierarchical tree of fingerprints for the input data object in step 804. It is noted that in at least some scenarios, the hierarchical tree may already have been generated for the data object (e.g., when the data object was first stored in the storage system). The top layer of the hierarchical tree is the input object-level fingerprint. In step 806, the deduplication system identifies a selected subgroup of fingerprints from a database of preexisting object-level fingerprints.

Now, at block 808, the deduplication system compares the value of the input object-level fingerprint against a database of preexisting object-level fingerprints maintained by the storage system. In some embodiments, as explained above, the deduplication system 111 may identify a subgroup or bucket of preexisting object-level fingerprints based on the value of the input object-level fingerprint prior to starting the matching process. Based on this comparison at block 809, the deduplication system ill identifies one or more preexisting object-level fingerprints to compare and match the input object-level fingerprint against. If, at block 808, the deduplication system 111 identifies a matching object-level fingerprint from the database of preexisting object-level fingerprints, deduplication system 111 identifies the input data object as completely identical to the identified preexisting data object and correspondingly deduplicates the input data object at block 810.

If an exact match is not identified, the deduplication system 111 proceeds to identify, at block 812, a related object-level fingerprint from the selected bucket of fingerprints. If one or more of such closely related fingerprints exist in step 814, processing proceeds to block 816, where a hierarchical comparison of the data objects if performed to identify and map any identical data blocks referenced by the input data object. If such identical data blocks exist, the deduplication system 111 deduplicates such blocks, as indicated at blocks 818 and 820.

Thus, methods and systems for identifying and mapping duplicate data blocks using hierarchical trees of fingerprints have been described. The techniques introduced above can be implemented by using programmable circuitry programmed by software and/or firmware, or by using special-purpose hardwired circuitry, or by using a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for detecting a duplicate data object at a storage server, the method comprising:
   receiving an input data object at the storage server, wherein the input data object references a plurality of data blocks;
   storing, at the storage server, the received input data object;
   generating, by the storage server, an object-level fingerprint for the input data object, wherein the object-level fingerprint is a single fingerprint representative of all of the data blocks referenced by the data object, wherein generating the object-level fingerprint comprises generating a hierarchical tree of fingerprints for the input data object, said hierarchical tree having a base layer and one or more upper layers above the base layer, the base layer having one fingerprint for each data block referenced by the input data object, each of the one or more upper layers having at least one fingerprint representative of a plurality of fingerprints from an immediately lower layer of the hierarchical tree, wherein a top layer of the hierarchical tree is the object-level fingerprint of the input data object, wherein each layer of the hierarchical tree is stored in a separate storage container; and
   detecting, at the storage server, whether the input data object is a duplicate data object by comparing the object-level fingerprint of the input data object against each of a plurality of preexisting object-level fingerprints maintained by the storage server, each preexisting object-level fingerprint corresponding to a unique data object maintained by the storage server.

2. A method as recited in claim 1, wherein, prior to said receiving an input data object at the storage server, the method further comprises:
   generating, by the storage server, a hierarchical tree of fingerprints for each of the unique data objects, said hierarchical tree having a base layer and one or more upper layers above the base layer, the base layer having one fingerprint for each data block referenced by the unique data object, each of the one or more upper layers having at least one fingerprint representative of a plurality of fingerprints from an immediately lower layer of the hierarchical tree, wherein a top layer of the hierarchical tree is the object-level fingerprint of each unique data object.

3. A method as recited in claim 2, wherein, in response to a determination that the object-level fingerprint of the input data object does not match any of the preexisting object-level fingerprints, the method further comprises:
   identifying a related unique data object maintained by the storage server, the related unique data object selected based on a comparison of a value of the object-level fingerprint of the input data object with values of the plurality of preexisting object-level fingerprints corresponding to the unique data objects.

4. A method as recited in claim 3, further comprising:
   starting from the top layer of the hierarchical tree and going down toward the base layer, identifying a matching of fingerprints in each layer of the input data object with corresponding fingerprints at the same layer of the related unique data object; and
   mapping the identified fingerprints of the input data object to matching fingerprints of the related unique data object, wherein said mapping is done for each identified fingerprint only at the highest level of the hierarchical tree at which the matching fingerprint is identified; and
   deduplicating one or more data blocks referenced by the input data object that correspond to the mapped fingerprints.

5. A method as recited in claim 4, wherein said deduplicating further includes:
   deleting the one or more data blocks referenced by the input data object that correspond to the mapped fingerprints; and
   redirecting logical references associated with the deleted data blocks by logically referencing each mapped fingerprint of the input data object directly to the corresponding matching fingerprint of the related unique data object.

6. A method as recited in claim 3, wherein the related unique data object is selected from a structured grouping of the unique data objects maintained by the storage server.

7. A method as recited in claim 6, wherein the structured grouping is a sorted listing of the plurality of preexisting object-level fingerprints based on a value of each of the plurality of preexisting object-level fingerprints.

8. A method as recited in claim 6, wherein the structured grouping includes generating multiple subgroups, each subgroup including a different subset of the plurality of preexisting object-level fingerprints based on a value of each of the plurality of preexisting object-level fingerprints.

9. A method as recited in claim 1, wherein, in response to a determination that the object-level fingerprint of the input data object matches a preexisting object-level fingerprint of a unique data object, the method further comprises:
   deleting the plurality of data blocks referenced by the input data object; and
   redirecting a logical reference of the input data object from the deleted plurality of data blocks to corresponding data blocks associated with the matched unique data object.

10. A method as recited in claim 1, wherein the input data object is detected to be a duplicate inline when the data object is received by the storage server.

11. A method for detecting a duplicate data object at a storage server, the method comprising:
   maintaining, by the storage server, a hierarchical tree of fingerprints for each of a plurality of unique data objects stored by the storage server, wherein the hierarchical tree of fingerprints includes a plurality of layers including a top layer, wherein each of the plurality of layers is stored in a separate storage container, and wherein the top layer of the hierarchical tree is representative of an object-level fingerprint of the unique data object corresponding to the hierarchical tree;
receiving an input data object at the storage server;
storing, at the storage server, the received input data object;
generating, by the storage server, a hierarchical tree of fingerprints for the received input data object, wherein a top layer of the hierarchical tree of the received input data object is representative of an object-level fingerprint of the input data object; and
detecting, at the storage server, whether the input data object is a duplicate data object by comparing the object-level fingerprint of the input data object against object-level fingerprints of each of the plurality of unique data objects.

12. A method as recited in claim 11, wherein, prior to said comparing the object-level fingerprint of the input data object against object-level fingerprints of each of the plurality of unique data objects, the method further comprises:
generating a structured grouping of the plurality of unique data objects based on a value of the object-level fingerprints corresponding to each of the plurality of unique data objects.

13. A method as recited in claim 12, wherein the structured grouping is a sorted listing of object-level fingerprints corresponding to the plurality of unique data objects.

14. A method as recited in claim 12, wherein said generating the structured grouping includes generating multiple subgroups, each subgroup including a different subset of the plurality of preexisting object-level fingerprints based on a value of each of the plurality of preexisting object-level fingerprints.

15. A method as recited in claim 14, wherein said comparing the object-level fingerprint of the input data object against object-level fingerprints of each of the plurality of unique data objects further includes:
identifying a value associated with the object-level fingerprint of the input data object;
identifying a subgroup of the multiple subgroups that is likely to have a matching unique data object based on a comparison of the value of the object-level fingerprint and a range of values of object-level fingerprints of the unique data objects of each subgroup of the multiple subgroups; and
comparing the object-level fingerprint of the input data object against each object-level fingerprint included in the identified subgroup.

16. A method as recited in claim 11, wherein, in response to a determination that the object-level fingerprint of the input data object matches a preexisting object-level fingerprint of a unique data object, the method further comprises:
deleting the plurality of unique data blocks referenced by the input data object; and
redirecting a logical reference of the input data object from the deleted plurality of data blocks to corresponding data blocks associated with the matched unique data object.

17. A method as recited in claim 16, wherein said redirecting a logical reference of the input data object includes logically referencing the object-level fingerprint of the input data directly to the object-level fingerprint of the matched unique data object.

18. A network storage server comprising:
a network adapter through which to communicate with a plurality of network storage clients via a network; and
a processor coupled to the network adapter and configured to:
receive an input data object, wherein the input data object references a plurality of data blocks;
store the received input data object;
generate a hierarchical tree of fingerprints having a plurality of layers, wherein one of the plurality of layers is an object-level fingerprint for the input data object, the object-level fingerprint being single fingerprint representative of all of the data blocks referenced by the data object; and
detect whether the input data object is a duplicate data object by comparing the object-level fingerprint of the input data object against each of a plurality of preexisting object-level fingerprints maintained by the storage server, each object-level fingerprint being stored in a separate storage container, each preexisting object-level fingerprint corresponding to a unique data object maintained by the storage server.

19. A network storage server as recited in claim 18, wherein the processor is further configured to:
generate a hierarchical tree of fingerprints for the input data object, said hierarchical tree having a base layer and one or more upper layers above the base layer, the base layer having one fingerprint for each data block referenced by the input data object, each of the one or more upper layers having at least one fingerprint representative of multiple fingerprints from an immediately lower layer of the hierarchical tree, wherein a top layer of the hierarchical tree is the object-level fingerprint of the input data object.

20. A network storage server as recited in claim 19, wherein the processor is further configured to:
generate a hierarchical tree of fingerprints for each of the unique data objects, each layer of said hierarchical tree having a base layer and one or more upper layers above the base layer, the base layer having one fingerprint for each data block referenced by the unique data object, each of the one or more upper layers having at least one fingerprint representative of multiple fingerprints from an immediately lower layer of the hierarchical tree, wherein a top layer of the hierarchical tree is the object-level fingerprint of each unique data object.

21. A network storage server as recited in claim 20, wherein, in response to a determination that the object-level fingerprint of the input data object does not match any of the preexisting object-level fingerprints, the processor is further configured to:
identify a related unique data object maintained by the storage server, the related unique data object selected based on a comparison of a value of the object-level fingerprint of the input data object with values of the plurality of preexisting object-level fingerprints corresponding to the unique data objects.

22. A network storage server as recited in claim 21, wherein the processor is further configured to:
starting from the top layer of the hierarchical tree and going down toward the base layer, identify a matching of fingerprints in each layer of the input data object with corresponding fingerprints at the same layer of the related unique data object; and
map the identified fingerprints of the input data object to matching fingerprints of the related unique data object, wherein said mapping is done for each identified fingerprint only at the highest level of the hierarchical three at which the matching fingerprint is identified; and deduplicate one or more data blocks referenced by the input data object that correspond to the mapped fingerprints.

23. A network storage server as recited in claim 21, wherein the related unique data object is selected from a structured grouping of the unique data objects maintained by the storage server.

24. A network storage server as recited in claim 23, wherein the structured grouping is a sorted listing of the plurality of preexisting object-level fingerprints based on a value of each of the plurality of preexisting object-level fingerprints.

25. A network storage server as recited in claim 23, wherein the structured grouping includes generating multiple subgroups, each subgroup including a different subset of the plurality of preexisting object-level fingerprints based on a value of each of the plurality of preexisting object-level fingerprints.

26. A network storage server as recited in claim 18, wherein, in response to a determination that the object-level fingerprint of the input data object matches a preexisting object-level fingerprint of a unique data object, the processor is further configured to:
   delete the plurality of data blocks referenced by the input data object; and
   redirect a logical reference of the input data object from the deleted plurality of data blocks to corresponding data blocks associated with the matched unique data object.

27. A storage system node for use in a cluster of network storage nodes, the storage system node comprising:
   a microprocessor;
   a machine-readable medium having program code stored thereon, the program code executable by the microprocessor to cause the storage system node to:
      maintain a hierarchical tree of fingerprints for each of a plurality of unique data objects stored by the storage system node, wherein the hierarchical tree of fingerprints includes a plurality of layers including a top layer, wherein each of the plurality of layers is stored in a separate storage container, and where in the top layer of each hierarchical tree is representative of an object-level fingerprint of the unique data object corresponding to the hierarchical tree;
      receive an input data object;
      store the received input data object;
      generate a hierarchical tree of fingerprints for the received input data object, wherein a top layer of the hierarchical tree of the received input data object is representative of an object-level fingerprint of the input data object; and
      detect whether the input data object is a duplicate data object by comparing the object-level fingerprint of the input data object against object-level fingerprints of each of the plurality of unique data objects.

28. A storage system node as recited in claim 27, wherein, prior to said comparing the object-level fingerprint of the input data object against object-level fingerprints of each of the plurality of unique data objects, the program code is further executable by the microprocessor to cause the storage node system to:
   generate a structured grouping of the plurality of unique data objects based on a value of the object-level fingerprints corresponding to each of the plurality of unique data objects.

29. A storage system node as recited in claim 28, wherein the structured grouping is a sorted listing of object-level fingerprints corresponding to the plurality of unique data objects.

30. A storage system node as recited in claim 28, wherein the program code is further executable by the microprocessor to cause the storage system node to:
   generate multiple subgroups, each subgroup including a different subset of the plurality of preexisting object-level fingerprints based on a value of each of the plurality of preexisting object-level fingerprints.

* * * * *